United States Patent [19]
Choi et al.

[11] Patent Number: 5,181,117
[45] Date of Patent: Jan. 19, 1993

[54] AUTOMATIC CONTRAST CONTROLLER OF A VIDEO CAMERA

[75] Inventors: Hae Y. Choi; Joon H. Lee, both of Suwon, Rep. of Korea

[73] Assignee: Samsung Electronics Co., Ltd., Suwon, Rep. of Korea

[21] Appl. No.: 383,535

[22] Filed: Jul. 24, 1989

[30] Foreign Application Priority Data

Aug. 6, 1988 [KR] Rep. of Korea ............... 88-10095

[51] Int. Cl.⁵ ............................................. H04N 5/57
[52] U.S. Cl. ................................ 358/169; 358/166; 358/167
[58] Field of Search ............... 358/169, 166, 167, 168, 358/172, 177, 32, 37, 36, 174

[56] References Cited

U.S. PATENT DOCUMENTS

| | | | |
|---|---|---|---|
| 3,914,545 | 10/1975 | Engle | 358/169 |
| 3,970,777 | 7/1976 | Bradford et al. | 358/169 |
| 3,976,836 | 8/1976 | Wheeler | 358/168 |
| 4,369,466 | 1/1983 | Matsuzaki et al. | 358/170 |
| 4,631,589 | 12/1986 | Hongu et al. | 358/171 |
| 4,811,101 | 3/1989 | Yagi | 358/171 |

Primary Examiner—James J. Groody
Assistant Examiner—Michael H. Lee
Attorney, Agent, or Firm—Robert E. Bushnell

[57] ABSTRACT

The invention provides an automatic contrast controller of a video camera including: a pedestal level sample-and-hold circuit for the video signal clamped to the pedestal level by the clamping pulse, a signal below reference level detecting circuit to remove the unnecessary signal by blanking so as to detect the only signal below the reference level, a lowest value detecting circuit to detect the lowest value of the average image signal detecting circuit for signal detecting average image signal and the clamped video signal, a comparing circuit to compare the output of the lowest value detecting circuit with the average signal level for amplification, and an amplifying circuit of variable gain to vary the gain of the signal below reference level detecting circuit, thereby setting the lowest signal level up to the specified level by the pedestal level and average level. Obtaining both a clean screen by provided; the video signal with a large contrast ratio and the contrast ratio compared during the vertical period of the video signal may be possible, moreover, by removing the conventional problem of the degradation of S/N ratio and non-effect of the operation according to the present invention.

29 Claims, 2 Drawing Sheets

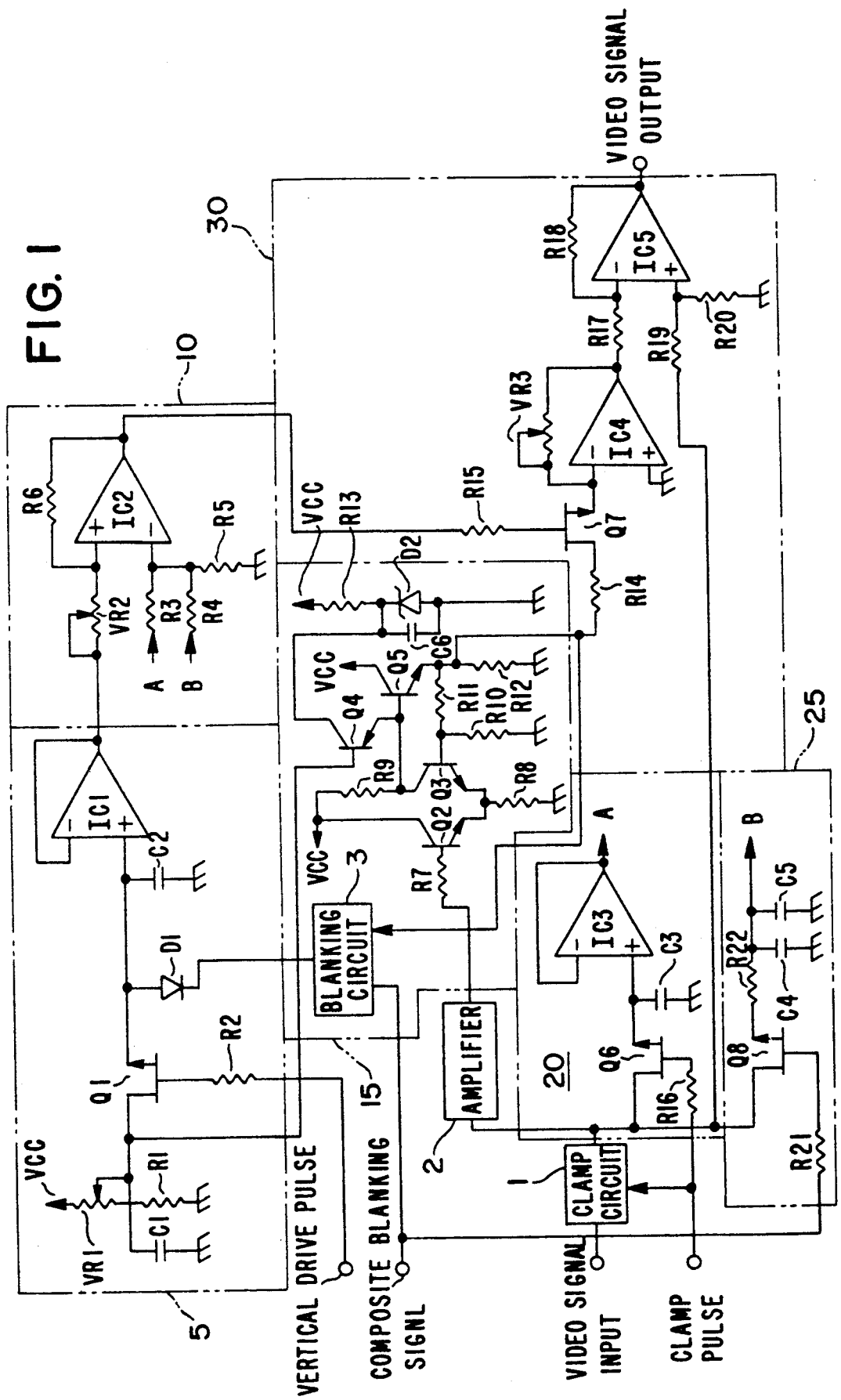

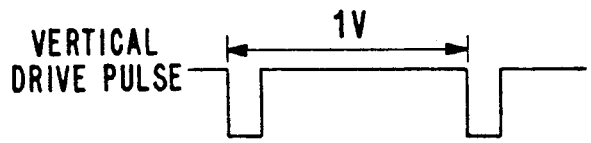
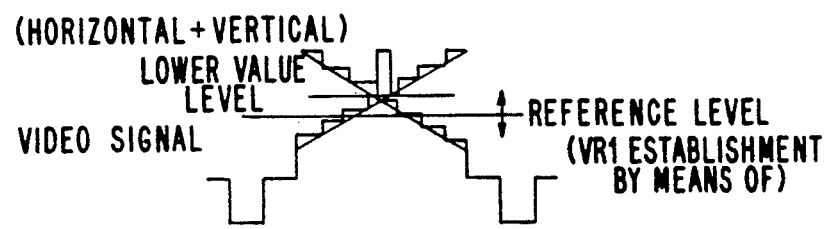
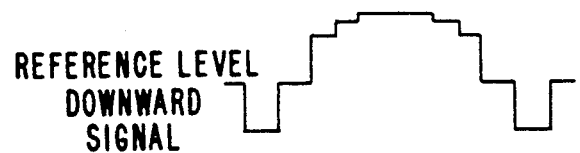
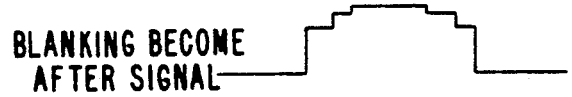
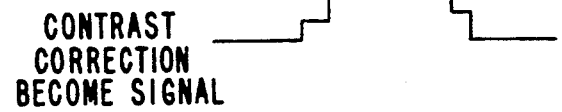
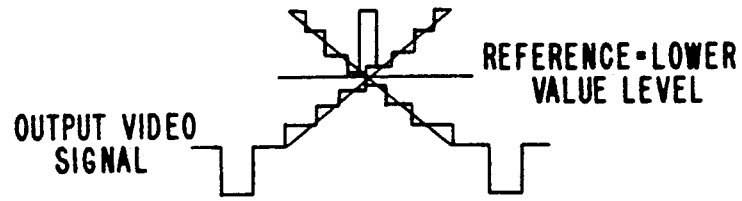
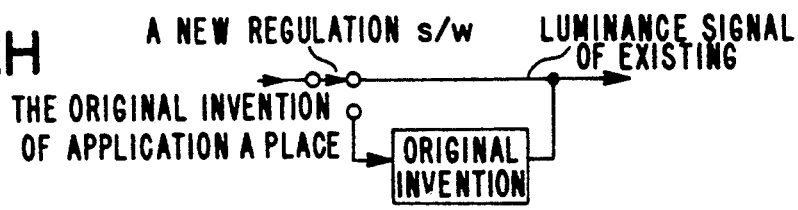

AUTOMATIC CONTRAST CONTROLLER OF A VIDEO CAMERA

BACKGROUND OF THE INVENTION

The present invention relates to an automatic contrast controller of a video camera, particularly to a controller in which the signal level of a dark part can be automatically controlled to obtain a large contrast ratio according to the average level of the video signal and the pedestal signal, in video cameras and video monitors.

In the past, if the level of the input video signal is below the constant reference level, then the large amplification is used, while if the level is above the reference level, the input signal is sent out as it is. Thus the transfer ratio(or amplification gain) between the input and output consists of differences below the constant reference level. That is, since the amplification gain for the signal below the constant reference level is large independently of the average level of the video signal, the relative noise is increased in case that the highest level of the video signal is low; while the average level of the video signal is above the reference level, then the reference level is needless since it is fixed at low level due to the signal-to-noise ratio(S/N). Thus if the signal below the reference level does not exist or most of the signal is above the reference level, then the operational effect can not be expected at all.

SUMMARY OF THE INVENTION

The present invention has been made in consideration of this and has for one object to provide an automatic contrast controller in which a clean screen with a large contrast ratio can be obtained by lowering the lowest level of the video signal to the pedestal signal, thereby controlling automatically the total contrast.

That is, in the present invention, the lowest level of the video signal, of the levels below the reference level, is detected, and it is lowered to the level determined by the outputs of the average image signal detector and the pedestal level detector so that the contrast of the total signal can be automatically adjusted. And in the past the reference level can not be established to a high level because of the S/N problem. But in the present invention, the reference level is irrelevant to the signal amplification and it only determines the range of detection for the video signal, so it is different with the conventional concept and also the amplification gain is variably determined according to the lowest level of the signal and the output of the pedestal signal level, coinciding with the state of the video signal. Also the contrast ratio is adequately adjusted by using the output of the average image signal detector.

According to the present invention, there is provided an automatic contrast controller of a video camera which includes a pedestal level sample-and-hold circuit for the video signal clamped to the pedestal level by the clamping pulse, a signal below reference level detecting circuit to remove the unnecessary signal by blanking so as to detect only a signal below the reference level, a lowest value detecting circuit to detect the lowest value of the average image signal detecting circuit for signal detecting an average value of the image signal and the clamped video signal, a comparing circuit to compare the output of the lowest value detecting circuit with the average signal level for the amplification, and an amplifying circuit of variable gain to vary the gain of the signal below the reference level detecting circuit, thereby setting the lowest signal level up to the specified level by the pedestal level and average level.

BRIEF DESCRIPTION OF THE DRAWINGS

FIG. 1 is a circuit diagram of present invention.
FIGS. 2A through 2H are waveform diagrams of present invention.

DETAILED DESCRIPTION OF THE INVENTION

The present invention will be now described in more detail with reference to accompanying drawings.

FIGS. 1 and 2 are circuit diagrams to account for the present invention. The video signal is clamped by the clamping pulse of the clamping circuit 1 and applied to the pedestal level sample-and-hold circuit 20 that includes a field-effect-transistor (FET)Q6 to which the clamping pulse is applied, a signal-charging condensor C3, and an op amp IC3 used as an emitter follower. Also, the output of the clamping circuit 1 is integrated by a resistor R22 and condensors C4 and C5 through a FET Q8 to which the composite blanking signal is applied, in the average image signal detecting circuit 25, and the integrated signal is provided as the output. Also, another output of the clamping circuit 1 is applied to the signal below reference level detecting circuit 15 through the dc amplifier 2.

And the output of the clamping circuit 1 is amplified through a single-ended differential amplifier including of transistors Q2 and Q3, and the amplified collector output of the transistor Q3 is applied to an emitter of the signal clipping transistor Q4, and also applied to a base of transistor Q5. The emitter output of the transistor Q5 is fed back to a base of the transistor Q3, and at the same time it applied to the variable gain amplifying part 30 in the signal below reference level detecting circuit 15.

At this time a reference voltage set by a variable resistor VR1, a resistor R1, and condensor C1 is applied to the base of the signal clipping transistor Q4, thereby establishing the drive-voltage of the transistor Q4. And a resistor R13 and a Zener diode D2 are connected to the collector of the transistor Q4 so that the clipping voltage is determined, also the condensor C6 stabilizes the ac signal clipping operation.

On the other hand, the reference voltage established by the variable resistor VR1, the resistor R1, and the condensor C1 is applied to the drain of the FET Q1 and the output of the FET Q1 driven by the vertical driving pulse is applied to the op amp IC2 of the comparing circuit 10 through the lowest value detecting circuit 5 which includes of the diode D1, condensor C2, and op amp IC1. At this time the outputs of the pedestal level sample-and-hold circuit 20 and the average image signal detecting circuit 25 are applied to an inverting terminal (−) of the op amp IC2. Thus, the output of the lowest value detecting circuit is compared with the outputs of the pedestal level sample-and-hold circuit 20 and the average image signal detecting circuit 25, thereby providing the difference level.

The output of the comparing circuit 10 is applied to the FET Q7, so that the output of the signal below reference level detecting circuit 15 is variably amplified. This amplified signal is applied to the op amp IC5 through the inverting op amp IC4 and is summed with the video signal, that is with the output of the clamping circuit 1 so that the composed video signal is provided.

As explained before a present invention is for obtaining the clean screen by adjusting automatically the contrast of the brightness signal component included in the video signal, where the input video signal is applied to the clamping circuit and is clamped by the clamping pulse, and the same output of the clamping circuit 1 is applied to the pedestal level sample-and-hold circuit 20.

In the pedestal level sample-and-hold circuit 20, when the clamping pulse of HIGH-level is applied to the base of the FET Q6, the output of the clamping circuit 1 is transferred from the drain to the source of the FET Q6 and charges condensor C3, while when a LOW-level clamping pulse is applied, the FET Q6 is turned off and the voltage of the condensor C3 due to the stored electric charge is transferred through the op amp IC3, that is the emitter follower, and this voltage is held until the next clamping pulse is applied. At this time, the voltage of a node A is applied to the resistor R3 of the comparing circuit.

One output of the clamping circuit 1 is applied to the drain of the FET Q8 of the average image signal detecting circuit 25 and the FET is turned on during effective image time by the composite blanking signal applied to the gate of the FET Q8 so that the image signal is integrated by the integrating resistor R22 and the condensors C4 and C5, and is provided to a node B. And the output of the average image signal, detecting circuit 25, that is, the voltage of the node B, is applied to the resistor R4 of the comparing circuit 10.

After the output of the clamping circuit 1 is amplified through the amplifier 2, it is applied to the base of the transistor Q2 of the single ended differential amplifier through the biasing resistor R7 in the signal below reference level detecting circuit 15 to detect only, the signal below the reference level and the output of the differential amplifier is provided to the collector of transistor Q3, where the resistor R9 is the collector output resistor of the transistor Q3.

The collector output of the transistor Q3 is applied to the emitter of the signal clipping transistor Q4 and the base of the buffer transistor Q5, and the output is provided through the emitter resistor R12 of the transistor Q5, and is again applied to the base of the transistor Q3 by the resistors R10 and R11, thereby forming the negative feedback circuit and stabilizing the circuit operation.

On the other hand, the reference voltage determined by the variable resistor VR1, the dividing resistor R1, and the by-pass condensor C1, is applied to the base of the signal clipping transistor Q4 and establishes the bias voltage of the its base so that the turn-on voltage of the transistor Q4 is established. At this time, the resistor R13 for the voltage division and a zener diode D2 is connected to the collector of the transistor Q4, thereby establishing the clipping voltage of a signal, also the clipping operation is stabilized in ac signal by the by-pass condensor C6.

The provided output from the emitter of the transistor Q5 is applied to the blanking circuit 3, and after the blanking by the complex blanking signal during the horizontal and vertical blanking periods, it is applied to the lowest value detecting circuit 5 through the diode D1. At this time, the FET Q1 of the lowest value detecting circuit 5 carries out a role resetting the lowest value detecting circuit 5 during the vertical period, and the vertical driving pulse is applied to the gate of the FET Q1 through the biasing resistor R2 so that the FET Q1 is ON when the driving pulse is HIGH-level.

The charging condensor C2 is charged to the established reference level by the variable resistor VR1 and the resistor R1 during the FET is turned ON, that is, the vertical driving pulse is HIGH-level, of the vertical blanking period. But the charged voltage of the capacitor C2 is discharged through the diode D1 according to the output signal level of the blanking circuit 3 so that it is discharged to the sum of specified voltage, that is, the forward built-in voltage(ON voltage) of the diode D1 and the lowest voltage of the signal level.

To prevent it, thus, in the present invention, the signal of the blanking circuit 3 has been made to be large so that the effect of the built-in voltage(ON voltage) of the diode D1 can be regarded, and the voltage of the capacitor C2 is provided through the op amp IC1, and used as an emitter follower. The output of the op amp IC1 is applied to a noninverting terminal(+) of the op amp IC2 through the variable resistor VR2 for a variety of the amplification gain, and R6 is a feedback resistor.

On the other hand, after the outputs of the pedestal level sample-and-hold circuit 20 and the average image signal detecting circuit 25, the outputs of node A and B, is amassed by the resistors R3, R4 and R5, it is applied to the inverting terminal(−) of the op amp IC2. The op amp IC2 with such input signals compares the output level of the lowest value detecting circuit 5 with the output levels of the pedestal level sample-and-hold signal detecting circuit 25, providing the difference level. This output is applied to the gate of the FET Q7 acting as the variable resistor through the biasing resistor R15 so that the variable amplification can be obtained. That is, the variable gain amplifying operation can be carried out by the resistor R4, the FET Q7, the variable resistor VR3, and the op amp IC4 so that the signal below reference level of the signal below reference level detecting circuit is applied to the resistor R14, and is reversely amplified through the drain-to-source resistor of the FET Q7.

Also, the input video signal come out from the clamping circuit 1 is applied to the noninverting terminal(+) of the op amp IC5 acting as the differential amplifier by the resistor R19 and R20, and the output of the inverting op amp IC4 is applied to the inverting terminal(−) of the op amp IC5 through the resistor R17. That is, the lowest value of the signals below reference level is sampled, and the sampled lowest value adjusts the gain of the variable gain amplifier as much as the difference so that the lowest value can be same with the level determined by the pedestal level and the average image level, and the amplified signal through said variable gain amplifier is added to the original input video signal, in other word, the inverted compensation signal is added to the input video signal.

Thus, the present invention can provide a clean and soft screen by controlling automatically the contrast of the brightness components included in the video signal.

To explain an example of the present invention with reference to FIG. 2, it follows. First, FIGS. 2A and 2B show the brief vertical driving pulse and the complex(-horizontal+vertical) blanking signal, respectively. FIG. 2C is an input video signal as an example of the remodulated signal, the level of the lowest value is above the reference level so that the total contrast ratio is low. And, FIG. 2D is a signal below reference level established by the variable resistor VR1, and E is the signal after the blanking of (D). FIG. 2F is a compensated signal, that is, the signal below reference is compensated according to the present invention, and the output of the op amp sends out the inverted signal of this. And FIG. 2G is the final output video signal appeared at the output terminal of the op amp IC5, where the signal of a dark part is compensated and the total black and white ratio becomes large. So that the clean screen can be obtained. FIG. 2H is an application example of the present invention, after installing a new switch, the compensated signal where the contrast ratio is controlled according to the present invention can be provided through the switch.

And, the present invention is applicated to the video camera, being used at the brigntness components of the video signal, also it can be applicated to the signal-processing for the brightness of the monitor and TV. In addition, it can be applied to the recorder of the video tape so that the clean video signal with a large contrast ratio can be achieved.

As mentioned above, the present invention can control automatically the total contrast ratio of the video signal by extracting the lowest signal of the video signal, and comparing it with the pedestal signal and the average video signal, and lowering the lowest level of the video signal to the pedestal signal level, thereby making the video signal with a large contrast ratio so that the clean screen can be obtained and the contrast ratio compared during the vertical period of the video signal can be obtained, also the conventional problem such as the degradation of S/N ratio and non-efect of the operation can be removed since the lowest signal is fitted with the level determined by the pedestal level and the average level.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. An automatic contrast controller of a video camera, comprising:
   pedestal level sample-and-hold means for holding a video signal clamped to a pedestal level by a clamping pulse to provide a clamped video signal;
   average signal detecting means for receiving said clamped video signal and a composite blanking signal and for providing an output integrated signal;
   signal below reference level detecting means for receiving an amplified clamped video signal and said composite blanking signal so as to detect only signals of said amplified clamped video signal that are below a reference level and for providing a detected output signal;
   lowest value detecting means for establishing said reference level and for providing an output in response to the detected output signal having unnecessary signals blanked therefrom in response to said composite blanking signal, said output representing a lowest value of said detected output signal;
   means for comparing the output of the lowest value detecting means to the output integrated signal combined with said clamped video signal for providing a variable amplification control signal; and
   amplifying means of variable gain for varying the gain of said detected output signal from said signal below reference level detecting means in response to said variable gain amplification control signal, for providing a compensated output signal and for combining said compensated output signal with said clamped video signal to provide an output video signal having high black and white ratio.

2. A controller according to claim 1, wherein the signal below reference level detecting means comprises:
   a first transistor for receiving said amplified clamped video signal;
   a second transistor for receiving said detected output signal;
   a clipping transistor for receiving said reference level; and
   a buffer transistor coupled said clipping transistor and for providing said detected output signal to said second transistor and said amplifying means.

3. An automatic contrast controlled of a video camera having an image information processing system for processing supplied image information, comprising:
   pedestal level sample-and-hold means for detecting a pedestal level from an output signal of a clamping circuit clamping an input video signal, according to a clamp pulse;
   average image signal detecting means for detecting an average image signal from the output signal of said clamping circuit according to an input composite blanking signal;
   signal below reference level detecting means for detecting signals below a reference level from said input video signal amplified and standardized by said clamping circuit and an amplifier;
   lowest value detecting means for providing said reference level and for providing an output signal in response to vertical drive signals and a signal output from said signal below reference level detecting means;
   comparing means coupled to receive said output signal from said lowest value detecting means for comparison to said pedestal level combined with said average image signal provided from said pedestal level sample-and-hold means and said average image signal detecting means, respectively;
   variable gain amplifying means for adjusting and amplifying a gain of said signal output from the signal below reference level detecting means, according to a signal provided from said comparing means.

4. The automatic contrast controller of a video camera as set forth in Claim 3, wherein said signal below reference level detecting means comprises:
   a first transistor having a base connected to a resistor for receiving an output of said amplifier, an emitter coupled to an emitter of a second transistor and to ground through a second resistor, and having a collector coupled to a voltage source and to a collector of said second transistor, an emitter of a third transistor and a base of a fourth transistor through a third resistor;
   said third transistor having a base connected to said reference level and a collector coupled to a parallel circuit having a capacitor and a zener diode coupled in parallel and to said voltage source via a fourth resistor, said parallel circuit being connected to ground;
   said fourth transistor having a collector coupled to said voltage source and having an emitter for providing said output of said signal below reference level detecting means to a base of said second transistor via a fifth resistor, to a blanking circuit, and to said amplifying means;

said blanking circuit being responsive to composite blanking signal for removing unnecessary signals from said output of said voltage below reference level detecting means and for providng a control signal to said lowest value detecting means;

said emitter of said fourth transistor being coupled to ground via a sixth resistor; and said base of said second transistor being coupled to ground via a seventh resistor.

5. The automatic contrast controller of a video camera as set forth in Claim 4, wherein said lowest value detecting means comprises:

a first variable resistor connected to said voltage source and to ground via a further resistor and having a wiper connected to ground via a second capacitor, wherein said wiper provides said reference level;

a first field effect transistor having a gate coupled to receive vertical drive signals via an eighth resistor, a source coupled to said wiper and a drain;

a diode having a cathode connected to said drain and an anode connected to an output of said blanking circuit;

a third capacitor connected to said drain, said cathode and to a positive input terminal of an operational amplifier, said third capacitor being further connected to ground, wherein said third capacitor is charged to said reference level in response to said vertical drive signals; and said operational amplifier having an output coupled to its negative input terminal and to said comparing means.

6. The automatic contrast controller of a video camera as set forth in Claim 5, wherein said comparing means comprises:

an output termnal of a differential amplifier;

a positive input terminal of said differential amplifier connected to said output of said operational amplifier via a second variable resistor and to said output terminal via a feedback resistor;

a negative input terminal of said differential amplifier connected to a ladder network; and said ladder network connected to receive said pedestal level and said average image signal.

7. The automatic contrast controller of a video camera as set forth in Claim 6, wherein said variable amplifying means comprises:

a second field effect transistor having a base coupled to said output terminal of said differential amplifier via a ninth resistor, a source coupled to said emitter of said fourth transistor via a tenth resistor, and a drain connected to a negative input terminal of a variable amplifier;

an output of said variable amplifier being feedback to its negative input terminal via a third variable resistor;

a positive input terminal of said variable amplifier being connected to ground;

a summing amplifier having a negative input terminal connected to the output of said variable amplifier via a tenth resistor and to an output of said summing amplifier via a thirteenth resistor;

a positive input terminal of said summing amplifier being connected to receive said clamped video signal via a fourteenth resistor, and being connected to ground via a fifteenth resistor; and wherein said summing amplifier provides an output video signal having a large black and white ratio.

8. An automatic contrast controller, comprising:

sample-and-hold means for providing, in response to reception of a video input signal, a video signal clamped at a pedestal level;

average signal detecting means for providing an output integrated signal based upon said video input signal and a composite blanking signal;

second detecting means for receiving said video input signal and said composite blanking signal, for detecting components of said video input signal having amplitudes below a reference level, and for providing a detected output signal;

third detecting means for establishing said reference level and for providing a second output signal in response to the detected output signal having signals blanked therefrom in response to said composite blanking signal;

means for providing a variable amplification control signal output by comparing the second output signal to the integrated signal combined with the video signal clamped at the pedestal level; and amplifying means of variable gain for providing a compensated output signal by varying the gain of said detected output signal from said signal below reference level detecting means in response to said variable amplification control signal.

9. The automatic contrast controller of claim 8, further comprised of said amplifying means combining said compensated output signal with said video signal clamped at the pedestal level to provide an output video signal with a black and white ratio dependent upon said compensated output signal.

10. An automatic contrast controller comprising:

means for providing first intermediate signals indicative of amplitudes of input video signals below a reference level;

means for providing pedestal level intermediate signals by maintaining said input video signals at a pedestal level;

means for providing averaged intermediate signals representative of averages of said amplitudes of said input video signals below said reference level; and means for providing control signals varying in dependence upon said pedestal level intermediate signals and said averaged intermediate signals.

11. The controller of claim 10, further comprised of means for generating second impedance signals characteristic of lowest amplitudes of said first intermediate signals, whereby said means for providing said control signals generates said control signals by comparing said second intermediate signals with said pedestal level intermediate signals and said averaged intermediate signals.

12. The controller of Claim 10, further comprised of:

means for periodically extracting lowest amplitudes of said first intermediate signals;

wherein said means for providing said control signals generates said control signals by comparing said lowest amplitudes with said pedestal level intermediate signals and said averaged intermediate signals.

13. The controller of claim 10, further comprised of:

means for providing variable gain signals by amplifying said first intermediate signals in dependence upon said control signals; and means for providing output signals by adding said input video signals and said variable gain signals.

14. The controller of claim 11, further comprised of:
   means for providing variable gain signals by amplifying said first intermediate signals in dependence upon said control signals; and
   means for providing output signals by adding said input video signals and said variable gain signals.

15. The controller of claim 12, further comprised of:
   means for providing variable gain signals by amplifying said first intermediate signals in dependence upon said control signals; and
   means for providing output signals by adding said input video signals and said variable gain signals.

16. The controller of claim 10, wherein said means for providing said first intermediate signals comprises:
   a first transistor having principal current conducting electrodes coupled between first and second reference terminals, and a control electrode coupled to respond to said input video signals;
   a second transistor having principal current conducting electrodes coupled between a first node and said second referenced terminal, and a control electrode providing a second node;
   a third transistor having a control electrode coupled to respond to a first potential at said reference level, and principal current conducting electrodes coupled between a third reference terminal and said first node;
   a fourth transistor having a control electrode coupled to said first node and principal current conducting electrodes coupled between said first reference terminal and a third node exhibiting said first intermediate signals; and
   a voltage divider coupled between said second and third nodes, and said reference terminal.

17. The controller of claim 11, wherein said means for providing said first intermediate signals comprises:
   a first transistor having principal current conducting electrodes coupled between first and second reference terminals, and a control electrode coupled to respond to said input video signals;
   a second transistor having principal current conducting electrodes coupled between a first node and said second referenced terminal, and a control electrode providing a second node;
   a third transistor having a control electrode coupled to respond to a first potential at said reference level, and principal current conducting electrodes coupled between a third reference terminal and said first node;
   a fourth transistor having a control electrode coupled to said first node and principal current conducting electrodes coupled between said first reference terminal and a third node exhibiting said first intermediate signals; and
   a voltage divider coupled between said second and third nodes, and said reference terminal.

18. The controller of claim 12, wherein said means for providing said first intermediate signals comprises:
   a first transistor having principal current conducting electrodes coupled between first and second reference terminals, and a control electrode coupled to respond to said input video signals;
   a second transistor having principal current conducting electrode coupled between a first node and said second referenced terminal, and a control electrode providing a second node;
   a third transistor having a control electrode coupled to respond to a first potential at said reference level, and principle current conducting electrodes coupled between a third reference terminal and said first node;
   a fourth transistor having a control electrode coupled to said first node and principal current conducting electrodes coupled between said first reference terminal and a third hnode exhibiting said first intermediate signals; and
   a voltage divider coupled between said second and third nodes, and said reference terminal.

19. The controller of claim 10, further comprising of:
   a first transistor having principal current conduction electrodes coupled to variably amplify said first intermediate signals in dependence upon said control signals;
   a first operational amplifier having a first input port coupled to receive said first intermediate signals from said first transistor, a second input port coupled to a reference potential and an output port providing variably amplified signals; and
   a second operational amplifier having a first input port coupled to receive said compensated signals, a second input port coupled to receive said input video signals, and an output port providing output signals representative of a sum of said video input signals and said variably amplified signals.

20. The controller of claim 11, further comprised of:
   a first transistor having principal current conduction electrodes coupled to variably amplify said first intermediate signals in dependence upon said control signals;
   a first operational amplifier having a first input port coupled to receive said first intermediate signals from said first transistor, a second input port coupled to a reference potential and an output port providing variably amplified signals; and
   a second operational amplifier having a first input port coupled to receive said compensated signals, a second input port coupled to receive said input video signals, and an output port providing output signals representative of a sum of said video input signals and said variably amplified signals.

21. The controller of claim 12, further comprised of:
   a first transistor having principal current conduction electrodes coupled to variably amplify said first intermediate signals in dependence upon said control signals;
   a first operational amplifier having a first input port coupled to receive said first intermediate signals from said first transistor, a second input port coupled to a reference potential and an output port providing variably amplified signals; and
   a second operational amplifier having a first input port coupled to receive said compensated signals, a second input port coupled to receive said input video signals, and an output port providing output signals representative of a sum of said video input signals and said variably amplified signals.

22. The controller of claim 10, wherein said means for providing said control signals comprises:
   a first operational amplifier having an output port coupled to provide said control signals, and a first input port coupled to a first node;
   a first resistance coupled to conduct said pedestal level intermediate signals to said first node;

a second resistance coupled to conduct said average intermediate signals to said first node; and a third resistance coupled between said first node and a reference potential.

23. The controller of claim 11, wherein said means for providing said control signal comprises:
 a first operational amplifier having an output port coupled to provide said control signals, a first input port coupled to a second node, and a second input port coupled to receive said intermediate signal;
 a first resistance coupled to conduct said pedestal level intermediate signals to said second node;
 a second resistance coupled to conduct said averaged intermediate signals to said second node; and
 a third resistance coupled between said second node and a reference potential.

24. The controller of claim 13, wherein said means for providing said control signals comprises:
 a first operational amplifier having an output port coupled to provide said control signals, and a first input port coupled to a first node;
 a first resistance coupled to conduct said pedestal level intermediate signals to said first node;
 a second resistance coupled to conduct said averaged intermediate signals to said first node; and
 a third resistance coupled between said first node and a reference potential.

25. The controller of claim 16, wherein said means for providing said control signals comprises:
 a first operational amplifier having an output port coupled to provide said control signals, and a first input port coupled to a fourth node;
 a first resistance coupled to conduct said pedestal level intermediate signals to said fourth node;
 a second resistance coupled to conduct said averaged intermediate signals to said fourth node; and
 a third resistance coupled between said fourth node and a reference potential.

26. The controller of claim 19, wherein said means for providing said control
 a first operational amplifier having an output port coupled to provide said control signals, and a first input port coupled to a first node;
 a first resistance coupled to conduct said pedestal level intermediate signals to said first node;
 a second resistance coupled to conduct said averaged intermediate signals to said first node; and
 a third resistance coupled between said first node and a reference potential.

27. The controller of claim 10, further comprised of:
 a blanking circuit coupled to respond to blanking signals by providing output signals exhibiting amplitudes determined by amplitudes of said input video signal;
 means for providing an output potential exhibiting said referenced level;
 lowest value detecting means for providing second intermediate signals having amplitudes respresentative of the lowest values of said amplitudes of said input video signals;
 means for resetting said lowest value detecting means in reponse to reception of a blanking signals; and
 whereby said means for providing said control signals generate said controls by comparing said amplitudes with said pedestal level intermediate signals and average intermediate signals.

28. The controller of claim 10, further comprised of:
 a blanking circuit coupled to respond to blanking signals by providing ouput signals exhibiting amplitudes determined by said amplitudes of said input video signals;
 a voltage divider having a first node providing a first potential exhibiting an amplitude at said reference level;
 a first operational amplifier having a first input port and an output port coupled to said means for providing control signals;
 a first transistor having principal current conduction electrodes coupled between said first node and a second input of said first operational amplifier, and a control electrode coupled to respond to periodic driving pulses; and
 a first capacitor coupled between said second input port of said first operational amplifier and a terminal for a reference potential.

29. A process for automatically controlling contrast, comprising:
 providing first intermediate signals indicative of amplitudes of input video signals below a reference level;
 providing pedestal level intermediate signals by maintaining said input signals at a pedestal level;
 providing averaged intermediate signals representative of averages of said amplitudes of said input video signal;
 generating second intermediate signals characteristc of lowest amplitudes of said first intermediate signals; and
 providing control signals varying in dependance upon said pedestal level intermediate signals and said averaged intermediate signals by comparing said second intermediate signals with said pedestal level intermediate signals and said averaged intermediate signals.

* * * * *

UNITED STATES PATENT AND TRADEMARK OFFICE
CERTIFICATE OF CORRECTION

PATENT NO. : 5,181,117

DATED : 19 January 1993

INVENTOR(S) : Hae Yong Choi, et al.

It is certified that error appears in the above-identified patent and that said Letters Patent is hereby corrected as shown below:

Title page, Item [75]

Change " Hae Y. Choi" to --Hae Yong Choi-- and change "Joon H. Lee" to --Joon Hee Lee--.

Signed and Sealed this

Twenty-sixth Day of October, 1993

Attest:

BRUCE LEHMAN

Attesting Officer

Commissioner of Patents and Trademarks